May 18, 1965 R. L. GAMAUNT 3,183,991

VEHICLE

Filed April 13, 1960 5 Sheets-Sheet 1

INVENTOR.
ROGER L. GAMAUNT
BY *H.C. Goldwire*
AGENT

May 18, 1965 R. L. GAMAUNT 3,183,991
VEHICLE
Filed April 13, 1960 5 Sheets-Sheet 3

INVENTOR.
ROGER L. GAMAUNT
BY H.C. Goldwire
AGENT

INVENTOR.
ROGER L. GAMAUNT
BY *H.C. Goldwire*
AGENT

INVENTOR.
ROGER L. GAMAUNT

BY *H.C. Goldwire*

AGENT

United States Patent Office
3,183,991
Patented May 18, 1965

3,183,991
VEHICLE
Roger L. Gamaunt, Fawnskin, Calif., assignor of ten percent to Harry E. Teasdall, Fallbrook, Calif., thirty-five percent to Geraldine E. Gamaunt, and ten percent to Harry Ervin Teasdall, as trustee
Filed Apr. 13, 1960, Ser. No. 21,981
18 Claims. (Cl. 180—24)

This invention relates to wheeled vehicles and more particularly to an arrangement, in such a vehicle, adapting the same for superior performance especially in rough terrain.

Briefly described, one embodiment of the vehicle has front and rear sets of wheels and an intermediate set of driven wheels whose suspension means is attached to the vehicle at or in vertical alignment with the longitudinal axis of the vehicle and rotatable on the vehicle, with the intermediate wheels, in a generally vertical plane and in complete independence, within its range of rotation, of the position (in roll) of the remainder of the vehicle. Means are provided for coordinated steering of two sets of the wheels. For powering the intermediate wheels, preferably located equidistant from the front and rear sets of wheels, a differential or the like is likewise mounted on the vehicle and is pivotable thereon with the intermediate wheels and suspension means. As an important feature of the invention, means are provided for implementing pivoting of the body portion on which the rear wheels are attached on the body portion bearing the front wheels, the pivoting being about a transverse pivot line or axis which is level when the rear body portion is laterally level. This same means restrains the rear body portion from pivoting on the forward body portion about any other than the above-mentioned transverse axis. Thus, to provide one relative orientation of the body portions as an example, no angular change, in a lateral sense, is possible between the longitudinal axes of the front and rear portions while both are laterally level. The aforesaid means further implement rotation of the rear body portion, relative to the forward body portion, on an axis identical to or parallel with the longitudinal axis of the forward portion and provide for the transmission of power from one body portion to wheels of the other during any combination of pivoting and/or rotation of one portion relative to the other. Thus, one embodiment of the invention includes a forward body deriving support from the forward wheels and a rear body deriving support from the rear wheels. One of the bodies (for example, the front body) is further provided with the intermediate set of wheels described above. Where desired, the front set of wheels as well as the other set of wheels are provided with driving power and brakes. The one of the bodies provided with the intermediate wheels preferably is disconnectable from and operable in indepedence of the other body.

A number of vehicles have been designated for good mobility over rough, uneven terrain, and vehicles have been provided with four or six driven wheels. The body construction of such vehicles and the mounting arrangements of the wheels therefor, however, have resulted in the application of large torsional loads on the vehicle when two or more pairs of wheels have rested on ground areas of differing lateral slope. The torsional load tend to strain and damage the vehicle body, and it is customary to provide a strong, heavily constructed frame to prevent this by receiving and withstanding some or all the wheel loads. In addition, however, torsional loads diminish the traction between a wheel or wheels of a vehicle and the ground by twisting action which tends to lift a wheel partially or entirely from the ground or, otherwise viewed, to prevent its dropping into full ground contact. It also has been known to construct vehicles with forward and rear bodies or sections which are relatively pivotable; and these, where the two sections pivot in a lateral sense relative to each other, tend to result in jackknifing of the vehicle or in sideward skidding of the middle pair of wheels when braking or tractive power is applied more strongly to one body section than the other or where loose gravel, etc. causes a difference in the traction of the wheels of the respective sections. This difficulty could be alleviated by reverting to a vehicle which is laterally rigid, with no part or section of it laterally pivotable on the other, but the problems introduced thereby include sideward scrubbing or skidding, in a six-wheeled vehicle, of the intermediate or other wheels during turns. This, again, may be alleviated by making a pair of the wheels freely casterable; but this solution is of no avail where it is desired to power or supply brakes on the castered wheels, for braking and tractive loads force the wheels out of track not only in turns but also in straightaway travel, as may also varying loads imposed on the wheels by uneven terrain.

It is, accordingly, a major object of the present invention to provide a vehicle with a plurality of pairs of wheels and having a body in which, within as wide a range of difference in wheel level as may be desired, there is a substantially complete freedom from torsional stresses imposed thereon by the wheels when some or all of the same lie at respectively different levels.

Another object is to provide a vehicle in which it is not necessary that a frame receive and bear torisonal loads imposed by the wheels in order that such loads will be prevented from being imposed on the body of the vehicle.

A further object is to provide a vehicle in which traction of all the wheels thereof is improved by virtue of a construction wherein torsional loads cannot be imposed on the vehicle by any wheel or wheels in a manner tending to diminish significantly the contact of any wheel with the ground.

Yet another object is to provide a vehicle having improved traction on its wheels by virtue of a construction wherein the remainder of the vehicle transmits to the wheels no vertical forces tending to lift the wheel or wheels away from the ground.

A still further object is to provide a vehicle having forward and rear bodies on which torsional loads are not imposed by the wheels during travel over uneven terrain and in which one of the bodies is self-propelling and operable separately from the other body.

Still another object is to provide a means for connecting forward and rear bodies of a vehicle in tandem with each other in a manner allowing rotation and a pivoting of the rear body relative to the forward body while preventing all pivoting of the rear body relative to the forward body in any plane at an angle to the vertical center-plane of the rear body.

Yet another object is to provide a vehicle in which the forward and rear bodies are relatively pivotable and rotatable as above and which has three sets of wheels, two of which sets are coordinatedly steerable.

An additional object is to provide, for a vehicle with more than one pair of wheels, a pair of wheels which remain substantially equally loaded even though each of them stands on ground of a different level.

Further objects and advantages will be apparent from the specification and claims and from the accompanying drawing which illustrates an embodiment of the invention.

Figure 1A:
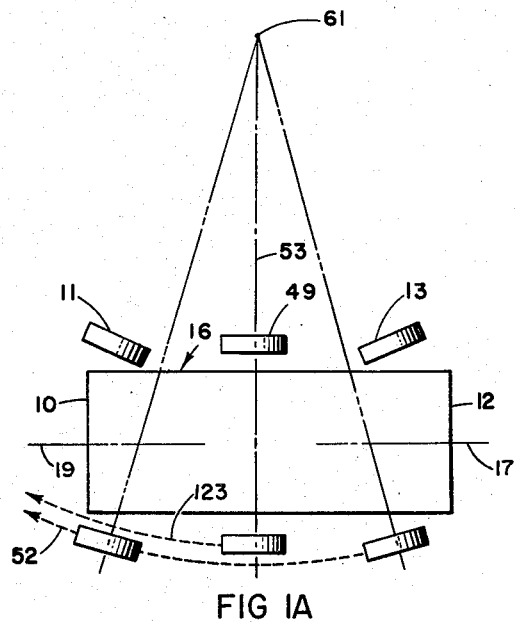
FIGURE 1A is a schematic view of a vehicle showing forward and rear body portions with respective, coordinatedly steerable pairs of wheels and further showing intermediate wheels.
Figure 1B:
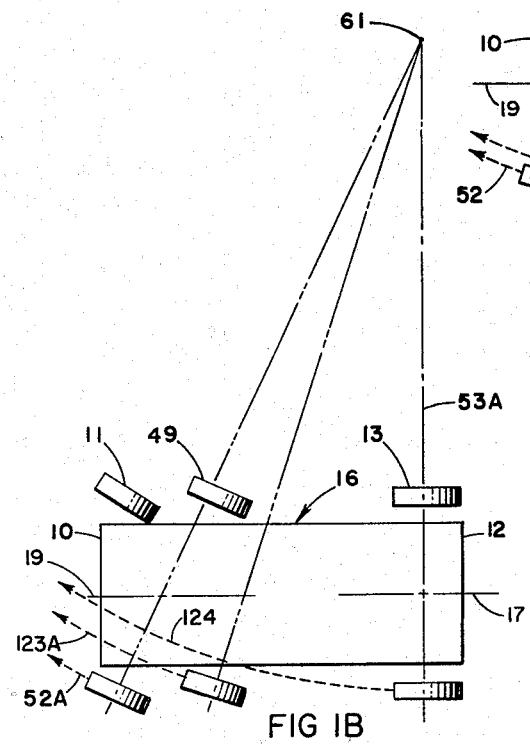
FIGURE 1B is a similar view in which the intermediate wheels and one of the remaining sets of wheels are steerable.

With initial reference to FIGURES 1A and 1B of the drawing, the numeral 10 denotes the forward portion of a vehicle bearing a front set of wheels 11 and the numeral 12 the vehicle rear portion on which is mounted a rear pair of wheels 13. Where the vehicle body portions 10, 12 are rigidly connected as by a construction in which the vehicle has a single, substantially rigid body 16 of which the portions 10, 12 are integral parts, then the body portions intermediate the portions 10, 12, serve to restrain the portions 10, 12 from movements caused by forces which would tend to rotate or pivot the longitudinal axis 17 of the body portion 12 relative to the longitudinal axis 19 of the body portion 10. In FIGURE 1A, the front and rear wheels 11, 13 are steerable. In FIGURE 1B, the intermediate wheels 49 and one of the other sets of wheels, for example, the front wheels 11, are steerable.

In the important modification of the invention shown in FIGURE 2, the body portions 10, 12 on which the front and rear wheels 11, 13 are respectively mounted are integral parts of separate forward and rear bodies 14, 15 connected in tandem by means which implement a rotation and a pivoting, in a particular manner described below, of the rear body 15 relative to the forward body 14 while transmitting tractive and braking as well as other forces between the bodies. This same means also mounts the intermediate set of wheels 49.

Figure 3:
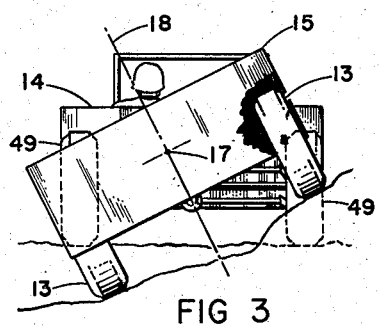
FIGURES 3 and 4 are respectively a rear view and a side view of the vehicle of FIGURE 2.
Figure 4:
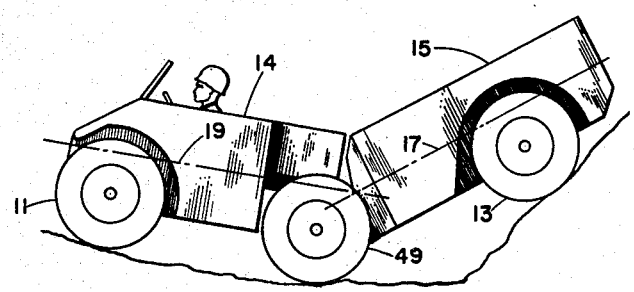
Figure 5:
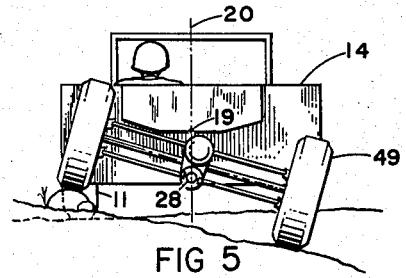
FIGURE 5 is a rear view of the forward body with the rear body disconnected therefrom.
Figure 2:
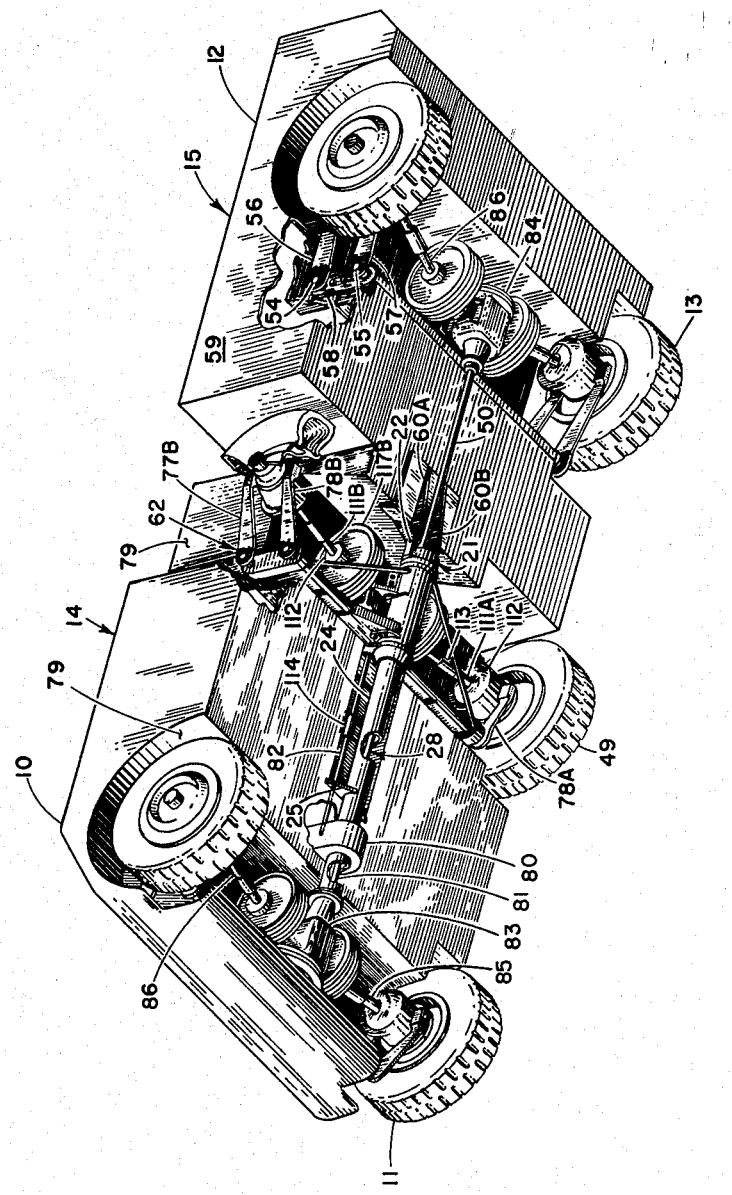
FIGURE 2 is a perspective view from below of the vehicle in an embodiment in which it is provided with forward and rear bodies.

As seen in FIGURES 2, 3, and 4, the rear body 15, including the body portion 12 on which the rear wheels 13 are mounted, has a longitudinal axis 17 which is taken as passing centrally through the body 15 in both a vertical and lateral sense. The vertical centerplane 18 extends longitudinally of the rear body 15 and, as seen in FIGURE 3, includes the longitudinal axis 17 and is vertical with respect to the earth when the rear body is laterally level. The forward body 14, as shown in FIGURES 4 and 5, has a similarly located longitudinal axis 19 and vertical centerplane 20.

Figure 6:
FIGURE 6 is a side view of the connecting and suspension means and middle differential, the connecting means being shown in partial longitudinal section.
Figure 6:
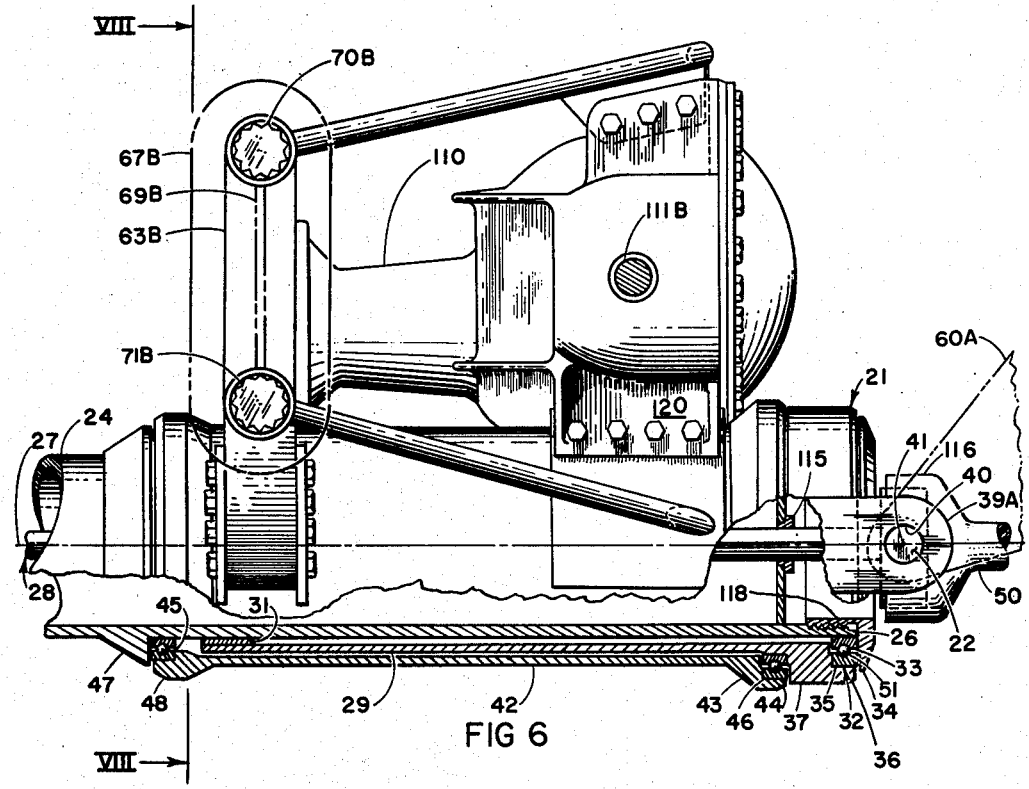

Refer to FIGURES 2 and 6. The means 21 connecting the forward and rear boddies 14, 15 preferably is mounted on the forward body 14 in the vertical centerplane 20 of the latter and is attached by means such as a pin or pins 22 to arms 60A, 60B of a fitting which in turn is rigidly mounted on the forward end of the rear body 15. The connecting means 21 has a first, preferably tubular member or element 24 which most conveniently extends along the underside of the forward body 14 and is rigidly attached thereto as by fittings 25. With reference to FIGURE 6, the first member 24 has an open rear end 26 and a longitudinal axis 27 along which extends a drive tube or shaft 28, which, as will be explained, transmits power to the rear wheels 13 and which has a portion 50 extending rearwardly from the rear end 26 of the first element or member 24. The connecting means 24. The connecting means longitudinal axis 27 is identical with that of the first member 24 and drive shaft 28 and is parallel with and preferably below and in lateral alignment with the forward body longitudinal axis 19, as can be seen in FIGURE 5 wherein the drive shaft 28 is shown to lie in the forward body vertical centerplane 20.

Returning to FIGURES 2 and 6, a second tubular member or element 29 of greater diameter than the first member 24 is rotatably mounted on the forward body 14 at the rear end thereof by attaching it in coaxial, overlapping relationship with the first member 24. The second element 29 therefore is an elongated member extending along the longitudinal axis of the front body. The second member 29 is rotatable about the longitudinal axis 27 of the connecting means 21. The forward end of the second member 29 lies well forward of the rear end 26 of the first member 24. The second member 29 bears against the outer surface of the first member 24 through front and rear bearing means 31, 32 which hold the member 29 rigidly coaxial with the first member 24 and transmit radially directed loads from one to the other of those members 24, 29. The front bearing 31 may be, as shown, a bushing made of a softer metal, while the rear bearing preferably comprises races, 33, 35 and balls 51 which can bear thrust as well as radial loads. The rear bearing 32 is mounted by making the inside diameter of its inner race 33 such that its inner face encircles and fits snugly on the outer surface of the first member 24; and its rear face bears against a fixed, annular, outwardly extending flange or thrust retainer 34 provided on or in the vicinity of the rear end 26 of the first member 24. The portion of the second tubular member 29 in the region of the front bearing 31 constitutes a first tubular portion, while that in the region of rear bearing 32 is a second tubular portion which is spaced from and coaxial with the first tubular portion. The portion of the tube 29 lying between these spaced, first and second tubular portions is structure rigidly connecting them. In cooperation with the first tubular member 24, the bearings 31, 32 constitute means mounting the two spaced, tubular portions on the front body 14 for rotation about an axis 27 parallel with the front body longitudinal axis 19 (FIGURE 4). To provide for ready assembly and disassembly of the connecting means 21 (FIGURES 2, 6), the flange 34 is made removable by rigidly mounting it on or making it integrally with a sleeve 118 whose male threads engage female threads of the first member 24. The outer race 35 fits snugly within and against the inner face of a rearwardly extending flange 36 formed on the rear face of and preferably integral with an annular collar 37 provided on and extending outwardly from the second member 29 forward of the first member rear end 26. The collar 37 has a rear face against which lies the forward face of the rear bearing outer race 35.

It will thus be understood that, whereas both the front and rear bearings 31, 32 bear radial loads between the first and second members 24, 29 and hold the second member 29 in fixed coaxial relationship with the first member 24, the first member bearing thrust retainer 34 constitutes a first stop means beyond which the second member collar 37 is rearwardly immovable on the first member 24 and that rearwardly directed thrust loads which may be imposed on the second member 29 are transmitted into the first member 24 and thence into the forward body 14 through the rear bearing 32 and the retainer or first stop means 34.

Figure 7:
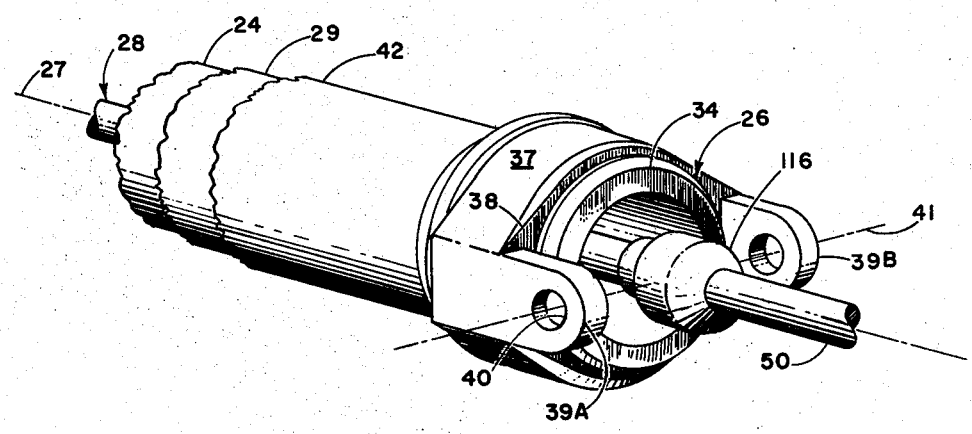
FIGURE 7 is a perspective view from the rear of the connecting means in which the suspension means and middle differential are omitted for clarity and simplicity of representation.

As shown in FIGURE 7, the radial thickness of the second tubular member collar 37 is increased as at 38 to provide clearance with the retainer 34 for a portion of the second tubular member 29 which, in the form of a lug or arm 39A, extends rearwardly relative to both the collar 37 and retainer 34. The lug 39A is rigidly related to and conveniently is made integral with the collar 37. A second, similar arm or lug 39B preferably is provided on the collar 37 diametrically opposite the first lug 39A. The ends of the lugs are equally spaced to either side of the connecting means longitudinal axis 27. Provision must be made for pivotal attachment of the lugs 39A, 39B, and hence of the second tubular member 29, to the rear body 15; and such provision is conveniently made by forming a pair of holes 40, one in each lug 39A, 39B, on an axis 41 which is perpendicular to the connecting means longitudinal axis 27 and which intersects the same at a point to the rear of the first stop means (bearing thrust retainer) 34. The inner faces of the arms or lugs 39A, 39B are preferably flat and normal to the axis 41 of the holes 40, which axis 41 is herein termed the transverse axis of the second tubular member portion or portions 39A, 39B extending rearwardly of the first tubular member 24.

A third element or tubular member 42 (FIGURE 6) of larger diameter than the second tubular member 29 is mounted in overlapping, fixedly coaxial relationship with the latter. The rear end of the third member 42 is provided with a collar 43 and bearing retaining flange 44 similar to the corresponding items 37, 36 on the second member 29, and similar provisions are made for the installation of a bearing 45 at the forward end of the third member. Boht the forward and rear bearings 45, 46 of the third member 42 are adapted for bearing thrust and radial loads. The inner race of the rear bearing 46 fits snugly about the outer circumference of the second member 29 just forward of the second member collar 37, and its rear face bears against the forward face of the latter. The outer race of the rear bearing 46 fits snugly within and is radially restrained by the inner face of the flange 44, while its forward face bears against and exchanges thrust loads with the rear face of the third member collar 43. The collar 37, through the bearing 46, limits travel of the third member 42 and hence is a second stop means whose functions include stopping the third member 42 from rearward travel on the second member 29, which latter in turn is stopped from rearward movement on the first member 24 by the first stop means 34.

A third stop means is provided in the form of an annular collar 47 integral with or rigidly mounted on the first tubular member 24 in encircling relation to the latter and located at the forward end of the second member 29. The rear face of this collar 47 has seated thereagainst the forward face of the inner race of the third member front bearing 45, whose inner face snugly encircles the first member 24. The bearing retaining means 48 at the forward end of the third member 42 is similar to the collar 37 and flange 36 in that it has faces which snugly seat the outer and rear faces of the outer race of the third member front bearing 45. The third member bearings 45, 46 take radial loads to hold the third member 42 in fixed coaxial relationship with the first and second tubular members 24, 29. As all the bearings 31, 32, 45, 46 permit rotation, relative to each other, of the elements 24, 29, 42 with which they are associated, both the second and third members 29, 42 are freely and independently rotatable about the connecting means longitudinal axis 27 and therefore about the first member 24.

It will be noted that (within, of course, normally expectable operating tolerances) the third stop means 47 holds the third member 42 in (and prevents forward travel of the same from) a position on the first member 24 in which the rear end of the third member 42 is held, through the bearing 46, against the second stop means 37 and the latter is held, through the bearing 32, against the first stop means 34. The several stop means 34, 37, 47, accordingly, cooperate to hold both the second and third members 29, 42 in fixed position along the longitudinal axis 27 of the first member and (since the first member 24 is rigidly mounted on the forward body 14) along the previously mentioned longitudinal axis 19 (FIGURES 4, 5) of the body 14. Upon inspection of the drawing, it will be seen that, by virtue of the described thrust-transmitting connections between the members 24, 29, 42 (FIGURE 6), forwardly directed forces on the third member 42 are transmitted into the rigidly mounted first member 24 at the third stop means 47, and similarly oriented forces on the second member 29 are received from the same by the first member 24 through the second stop means 37, third member 42, and third stop means 47. Rearwardly directed forces on the third member 42 pass through the second and first stop means 37, 34 and enter the first member 24 at the first stop means 34. Both forwardly and rearwardly directed forces imposed on the first member 24 are similarly transmitted into the second and third members 29, 42. Radial loads on the third and second members 42, 29 are transmitted into and received from the first member 24 through the bearings 31, 32, 45, 46. It will, of course, be understood that the bearings shown and described herein are provided by way of specific example, and that still other types of bearings and other arrangements and modes of installation thereof may be employed.

The front pair of wheels 11 is mounted on and in supporting relation to the forward portion 10 of the vehicle and, as shown in FIGURES 1A, 1B, and 2, the rear set of wheels 13 is similarly mounted on the rear portion 12. The third set of wheels 49 occupies a position intermediate the front and rear sets 11, 13, and for six-wheel operation of the vehicle, preferably are equidistant therefrom. In the example shown in FIGURES 1A and 2, both the front and rear wheels 11, 13 are coordinatedly steerable, as will be explained, in a manner wherein the rear wheels 13 follow in the tracks of the front wheels 11. Thus, in a turn, the outer front and rear wheels 11, 13 follow an arc 52 about the turning center 61 of the vehicle and the outer middle wheels 49 a similar, concentric arc 123 arc about the same center; and a radius 53 from that center 61 passes centrally through both of the middle wheels 49. As a consequence of this construction, sideward slippage or "scrubbing" of the middle wheels 49 is virtually eliminated in turns on flat terrain and is much reduced under other conditions of travel. The steering means (to be described) maintains the front and rear wheels 11, 13 normal to respective radii emanating from the turning center 61.

It will be noted, however, that the vehicle is not limited to a form in which the forward and rear wheels 11, 13 are steerable. Thus, even where all the wheels 11, 49, 13 are powered and/or braked, it is feasible to provide, as shown in FIGURE 1B, steerable front and middle sets of wheels 11, 49, whereupon the rear wheels 13 are not steerable. By reverse of direction of travel of the vehicle, the wheels 11, 49 become steerable rear and middle sets of wheels, while a front set of wheels 13 are fixed. Although centrally located in a preferred embodiment, the intermediate set of wheels need not necessarily be located equidistant from the front and rear sets of wheels 11, 13 and, as shown in FIGURE 1B may be, for example, nearer the front wheels 11 than the rear wheels 13. In this embodiment, a radius 53A from the turning center 61 passes centrally through the rear wheels 13 and the steering means (to be described) coordinatedly deflects the other wheels as required during turns to maintain each wheel 11, 49 normal to a respective radius from that same center 61. The front, intermediate, and rear wheels 11, 49, 13 accordingly all follow respective, concentric arcs 52A, 123A, 124.

The rear wheels 13 are mounted, as shown in FIGURE 2, on the rear body 15 by means of suspension means torque rods and arms. For the left-hand one of the rear wheels 13, for example, upper and lower torque rods 54, 55 have outboard ends which extend through the left-hand side of the rear body 15 and are held in fixed spacing from each other by a fitting or plate 58 which preferably lies against a face of the rear body left-hand side panel 59 and is rigidly attached thereto by bolts or other suitable means. The inner ends of the torque rods 54, 55 are rigidly attached ot the rear body 15 by means (not shown) which rigidly prevent their turning relative to the body, while the outer ends are free to rotate in the fitting 58. An arm 56 or 57 extends rearwardly from each torque rod 54 or 55 to the wheel 13, to which the arms are pivotally attached at vertically separated points, as may best be seen at the right-hand one of the rear wheels 13. While trailing arms 56, 57 are shown, it will be evident that forwardly extending arms could be employed at any of the pairs of wheels 11, 13, 49. Since the use of torque rods and arms for resiliently mounting wheels on vehicles is known in the art, as is the pivotal attachment of steerable wheels to the ends of torque arms, no further explanation of the same will be made. It will be noted, however, that the front wheels 11 are similarly mounted on the forward body 14 and that the supporting force applied to the forward or rear body 14 or 15 by each wheel 11 or 13 is applied thereto at the respective side of the particular body 14 or 15 on which the respective wheel 11 or 13 is located, support of the other side of the body 14 or 15 on which the wheel 11 or 13 is located being provided by the wheel mounted on that other side.

FIGURE 2 shows a fitting rigidly mounted on the forward end of the rear body and having a spaced pair of arms 60A, 60B which fit between the connecting means lugs 39A, 39B (FIGURES 6, 7) and are pivotally attached to the same by respective pins 22 which pass through the lug holes 40. The arms 60A, 60B and pins 22 thus constitute means pivotally connecting the ends of the lugs or arms 39A, 39B to the rear body at a pair of points which are rigidly fixed relative to the rear body and which are equally spaced from the in-register longitudinal axes 19, 17 of the front and rear bodies 14, 15. With added reference to FIGURE 4, the rear body 15 is pivotable on the pins 22, and hence on the forward body 14, on the transverse axis 41 (FIGURE 7) of the second tubular member portion (i.e., lugs 39A, 39B) extending rearwardly of the first tubular member 24. Since the second tubular member 29 and lugs 39A, 39B are rotatable about the connecting means longitudinal axis 27 (FIGURES 6, 7), the rear body 15 is rotatable (see FIGURE 3) with the second member 29 and relative to the forward body 14, 15 about an axis (i.e., the connecting means longitudinal axis 27) which is parallel to the longitudinal axis 19 (FIGURES 4, 5) of the forward body 14. As explained above, the second member 29 is held in rigidly coaxial relationship with the first member 24, and thus in parallel relation to the longitudinal axis 19 of the forward body 14, by the connecting means bearings 31, 32, 45, 46. The rear body fitting arms 60A, 60B are so proportioned and located that the axis of the aligned, snug-fitting pins 22, identical with the transverse axis 41, is perpendicular to the vertical centerplane 18 (FIGURE 3) of the rear body 15 and thus, when both bodies 14, 15 are laterally level, to the forward body vertical centerplane 20. Hence, with both bodies 14, 15 laterally and longitudinally level, the rear body 15 is rigidly held in a relationship in which its longitudinal axis 17 is at a zero angle to the longitudinal axis 19 of the forward body 14 and thus lies in a common vertical plane with the same. While the rear body is laterally level, then the transverse axis lies in a horizontal plane and pivoting of the rear body 15 on the forward body 14 (FIGURE 4) is limited to motion in a vertical plane; and this remains the case even though only the rear body is laterally level and the front body tilted, for the transverse axis 41 about which the rear body 15 must pivot remains level as long as the rear body is level. When the rear body 15 is laterally tilted, the second member 29 rotates and the transverse axis 41 tilts with it and always remains perpendicular to the rear body vertical centerplane 18; thus, any pivoting of the rear body 15 on the forward body 14 is always and only in the rear body vertical centerplane 18, and the connecting means 21 restrains the rear body from pivoting in all planes at an angle to the rear body vertical centerplane 18. Within these limitations, the connecting means 21 freely allows either pivoting (FIGURE 4) or rotation (FIGURE 3) or any combination of simultaneous pivoting and rotation of the rear body 15 relative to the forward body 14. As to the range of pivoting of the rear body on the forward body, this is of course limited by the dimensions of the forward and rear bodies 14, 15; for example, as shown in FIGURE 4, upward pivoting of the rear body, if continued, would eventually result in and be stopped by a contact between the two bodies. The bodies 14, 15 may be dimensioned and shaped to change the range of pivoting as desired; a pivot range of 37.5 degrees will be found adequate for most applications.

It should be noted that the connecting means 21 rigidly holds the forward and rear bodies 14, 15 at a fixed distance from each other in the sense that they are connected at a point marked by the transverse axis 41 and longitudinally fixed with reference to the longitudinal axes 17, 19 of both the bodies 14, 15.

Figure 8:
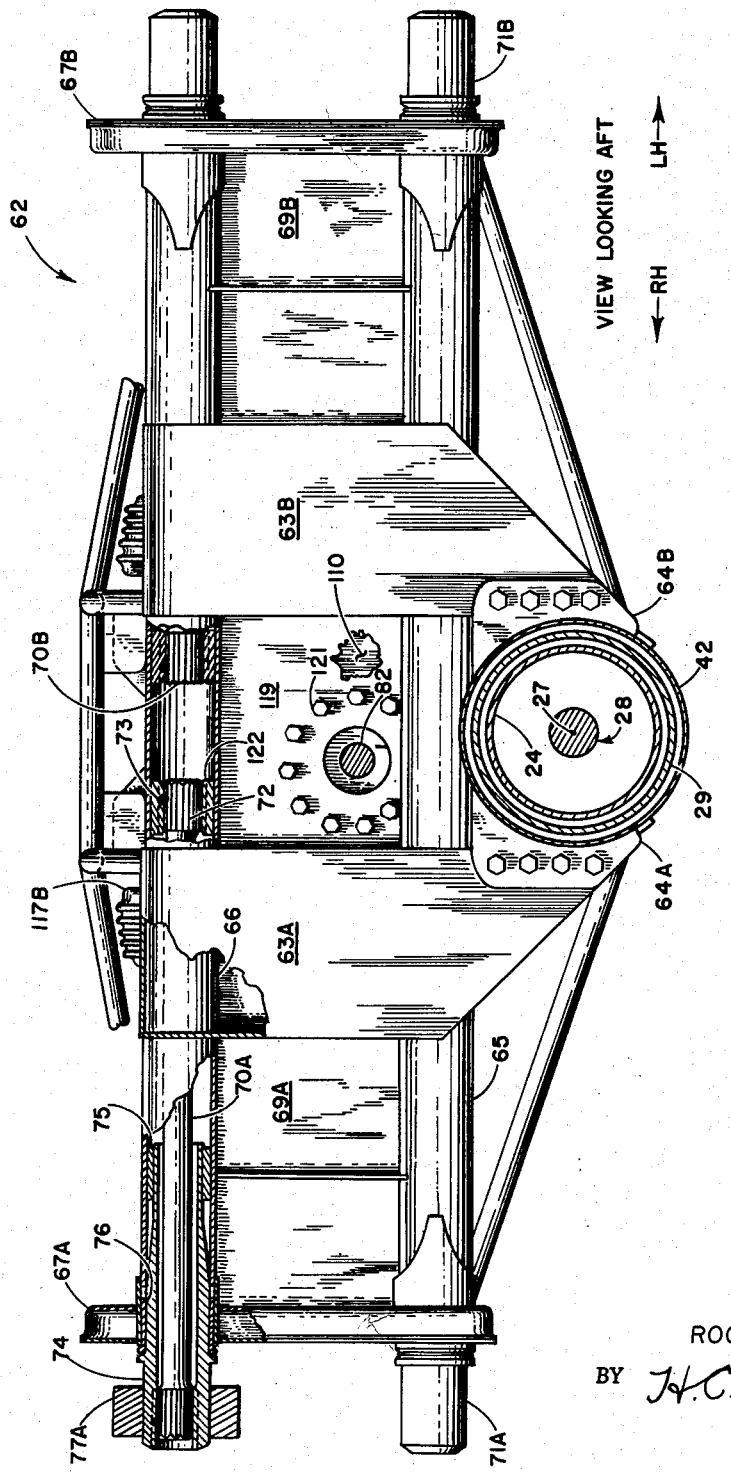
FIGURE 8 is a view looking to the rear and taken as at line VIII—VIII of FIGURE 6, some parts being shown as partially cut away or in longitudinal or cross section.

The third or intermediate pair of wheels 49 are mounted on the vehicle in a manner different, in certain important respects, from the mounting of the front and rear wheels 11, 13. With references to FIGURES 2 and 8, the first member 24 is, as explained, an elongated member rigidly attached to one of the bodies of the vehicle and specifically, in the example described, to the forward body 14. The middle wheels suspension means 62 is a substantially rigid structure which is elongated and perpendicular to the longitudinal axis 27 of the first member 24 (which axis is seen in end view at the center of the shaft 28) in order that its ends, on which the middle wheels are mounted, will evenly space the middle wheels on opposite lateral sides of the forward body longitudinal axis 19. The suspension means 62 is rigidly mounted on the third member 42 and thus is rotatable about the second member 29 and first member 24 in a plane perpendicular to the longitudinal axis 27 of the first member 24 and hence to the longitudinal axis 19 of the forward body 14. The middle wheels 49 thus are mounted on the forward body 14 through the first member 24, about which their suspension means 62 is freely rotatable. Support of the vehicle by the middle wheels 49 thus is through the first member 24, which latter member is rigidly mounted at the transverse center of the forward body 14. In the preferred embodiment, a pair of torque boxes 63A, 63B are rigidly attached as by fitting 64A, 64B welded or otherwise mounted on the third member 42 on opposite lateral sides of the latter. Extending through and rigidly atached to both torque boxes 63A, 63B is a lower torque rod housing 65 which is a tubular member extending perpendicular to and to each side of the first member axis 27. An upper torque rod housing 66 similarly extends through and is rigidly attached to the upper ends of the torque boxes 63A, 63B; the two housings 65, 66 are parallel. The right-hand ends of the housings 65, 66 are held in rigidly spaced relationship by an outer torque box 67A rigidly mounted thereon, and the assembly is further strengthened by a vertical web 69A welded or otherwise attached between the housings 65, 66 and extending from the inner box 63A to the outer box 67A. A similar web 69B and outer torque box 67B are provided on the left-hand side of the assembly, while a central web 119 connects the two inner boxes 63A, 63B.

The right-hand portion of the upper housing 66 contains an upper, right-hand torque rod 70A whose inner end lies approximately at the mid-length of the housing 66 and is rigidly mounted against radial, longitudinal and rotational movements therein. This mounting is conveniently accomplished by welding or otherwise rigidly mounting a bushing 122 in the torque rod housing 66 and providing the same with splines engaging matching splines 72 on the inner end of the torque rod 70A, the rod being retained in the bushing as by a transverse pin 73.

The outer end of the torque rod 70A is rotatably supported in the right-hand outer end of the housing 66 by a sleeve 74 splined and pinned to the outer end of the torque rod 70A and extending well into the housing 66, where it is restrained from radial movements and made freely rotatable in the housing by bearings 75, 76. The upper arm 77A of the right-hand one of the middle wheels 49 is rigidly mounted, as by welding, on the outer end of the sleeve 74. The upper, left-hand torque rod 70B is similarly mounted in the left-hand end of the upper housing 66, and right- and left-hand torque rods 71A, 71B are provided in the lower housing 65. Arms are attached to the outer ends of all the torque rods, for convenience only a fragment of the upper, right-hand arm 77A being shown in FIGURE 8.

As shown in FIGURE 2, the suspension means 62 has clearance from the forward body 14 in order that it may freely rotate, relative to the forward body, in a laterally extending plane and about the longitudinal axis of the connecting means first member 24. The arms 77B, 78B at the left-hand end of the suspension means and the corresponding arms at the right-hand end (only the lower arm 78A being shown) are connected, of course, in supporting relation to the outer ends of the axles 111A, 111B of the middle wheels 49, as is most clearly shown in the case of the left-hand one of the middle wheels 49.

While the connecting means members 24, 29, 42 (and therefore the middle wheels 49) have been described, by way of preferred example as mounted on the forward body 14, it will be evident that these items alternatively may be mounted on the rear body 15.

The manner in which the torque rods 70A, 70B, 71A, 71B and arms 77A, 77B, 78A, 78B resiliently mount the middle wheels 49 and permit their upward and downward deflection relative to the torque rod housings 65, 66 will not require explanation. It will be noted, however, that while the middle wheels 49 support the forward body 14 and, through the connecting means 21, the rear body 15, they, through their suspension means 62, are freely rotatable about the axis 27 of the first member; and a terrain condition which raises or lowers one middle wheel 49 relative to the other has no effect whatever tending to roll either body 14 or 15 on its longitudinal axis. The position, in roll, of the forward body 14 is dictated solely by the positions, relative to each other, of the front wheels 11 and that of the rear body 15 by the rear wheels 13. This is true, of course, only as long as the rotation of the middle wheels suspension means 62 is within a range precluding the striking of the latter or the middle wheels 49 on the body 14. While it has been found that a cut-out or well 79 (FIGURE 2) at the rear of the forward body so proportioned as to allow the middle wheels 49 and suspension means 62 to rotate 15 degrees from the horizontal is ordinarily adequate, it is obvious that the forward body 14 is easily shaped and proportioned to prevent interference and to allow any range of rotation which might be desired. An important advantage of the construction described lies in the attainment of a complete freedom from torsional stresses imposed on the bodies 14, 15 even though the six wheels 11, 13, 49 may lie on as many different levels. A much simpler and lighter construction of the bodies 14, 15 is thus made possible, and there is no need for the separate frame which ordinarily must be employed to take torsional loads transmitted thereto by the wheels and to prevent the loads from being imposed on the bodies. The construction employed, as contrasted with a longitudinally rigid construction, also removes bending loads which would tend to introduce body strains. In the situation shown in FIGURE 4, for example, a vehicle with a single, rigid, longitudinal axis would be held with its middle wheels entirely off the ground and with considerable gravitational loads which would tend to bend the vehicle at or near its middle.

By virtue of the present construction, all the wheels 11, 13, 49 rest on the ground and bear a share of the vehicle weight; neither body 14 or 15, within the range of pivoting of the rear body 15, places any bending stress on the other.

All the wheels 11, 13, 49 preferably are powered by means which include a power distribution box 80 receiving power from an engine, clutch, and transmission (not shown) and transmitting it through respective drive shafts 81, 28, 82 (all of which shafts are connected to the box 80) to the front, rear and middle wheels 11, 13, 49. A power distribution box accomplishing these functions is identified in the War Department Techanical Manual TM9–810, United States Government Printing Office, 1949. Since they are well and widely known in the art, such power distribution boxes will require no detailed explanation. It is desirable, however, that the box 80 employed allow for powering (as may be desired) any one, any two, or all three sets of wheels 11, 13, 49, and those versed in the art will have no difficulty in providing, in a power distribution box, the gearing, etc. necessary where such versatility of operation is required. The front and rear differentials 83, 84 are rigidly mounted on the respective bodies 14, 15 and are each provided with a pair of axles such as 85, 86 through which power is transmitted to the related wheels. The middle differential 110, as seen in FIGURE 6, is rigidly mounted on the third member 42 in fixed relationship to the latter and to the middle wheel suspension means 62 as by a fitting 120 attaching its rear end to the third member 42 and by bolts 121 (FIGURE 8) attaching its forward end to the web 119 between the central torque boxes 63A, 63B; hence, it is rotatable about the longitudinal axis 27 of the connecting means 21. The drive means or axles 11A, 11B (see also FIGURE 2) connecting respective middle wheels 49 to the differential 110 are each provided with a universal joint 112 (FIGURE 2) or equivalent at each end and with a slip joint 113 that permits necessary changes in length of the axles 11A, 11B as the wheels 49, together with the axles, are deflected relative to the differential 110 and suspension means 62. Similar universal joints and slip joints are provided at the other wheels and, where required, in the drive shafts. A slip joint 114 will be noted in the middle wheels drive shaft 82. Braking means are supplied for each wheel, and this is conveniently accomplished by employing a brake assembly whose moving parts (not shown) are connected to the respective axle, for example, the axle 111B, at a location inboard of the inner universal joint for that axle and having a housing such as 117B which is rigidly, non-rotatably related to the differential from which the axle extends.

The rear wheels drive shaft 28, if the power distribution box 80 is mounted (as shown) in the front body 14, must extend between the front and rear bodies 14, 15. From the box 80, the shaft 28 extends coaxially and rearwardly within and through all the length of the first member 24, within which it is mounted by suitable bearings such as 115 (FIGURE 6). A universal joint 116 (FIGURES 6, 7) is provided in the shaft 28 at the rear of the connecting means 21, and this joint is so located that the shaft portion 50 extending rearwardly therefrom and to the rear differential 84 is universally pivotable about a point which (FIGURES 6, 7) occurs at the intersection of the connecting means longitudinal axis 27 with the transverse axis 41 of the second member portion 39A, 39B extending rearwardly of the first member 24. The shaft rear portion 50, extending under the rear body 15, pivots in unison with the latter relative to the forward shaft portion 28 and forward body 14, the pivoting being about the same transverse axis 41, thus solving the problem of power transmission between the two relatively movable bodies 14, 15 and obviating the need, for such purpose, of a slip joint in the shaft forward or rear portion 28 or 50.

Since no torsional stresses are placed on the bodies 14, 15 by the wheels 11, 13, 49, such forces are not transmitted, as in other vehicles, through the body or bodies to a wheel or wheels in a manner tending to partailly or completely lift the latter from the ground; and differences in level between longitudinally spaced wheels which would, as in FIGURE 4, tend to take a pair of wheels off the ground in a vehicle with a single, rigid, longitudinal axis, leave all six wheels of the present vehicle firmly in contact with the ground. Further, an added load placed on one wheel (for example, as where, in FIGURE 5, an object raises one wheel above the level of the other) will, of course, cause some upward deflection of the arms of that wheel, and this, in the case of one of the middle wheels 49, places an upward force on one end of the middle wheels suspension means 62 (FIGURE 2) which is transmitted through the same and, by virtue of its rotatable mounting at its center, appears as an equal, downward force on the opposite one of the wheels 49 which deflects its arm, also, upwardly. The two middle wheels 49, accordingly, share the added load applied by added upward thrust of the terrain on one of them. Since the positions in roll of the forward and rear bodies 14, 15 are independent of each other and are dictated solely by the positions of the front and rear wheels 11, 13, it will be evident that the same phenomenon of load-sharing occurs to an increased and highly beneficial extent at the front and rear wheels. The loading of all the wheels thus tends to be much more uniform on rough and uneven terrain than in previous vehicles; and beside the many other advantages including lessened wear and likelihood of damage to the tires, the very important advantage appears of constantly good traction at all the wheels 11, 13, 49 no matter how diverse their positions may be relative to a horizontal plane. This, and the other advantages noted above, provides the vehicle with a markedly superior advantage in its ability to move over rough and steep terrains not only when the vehicle is operated in its six-wheeled configuration but also when the rear body 15 is disconnected, as by disconnecting the pins 22 (FIGURE 2) and drive shaft universal joint 116 (FIGURE 7) for operation of the forward body 14 as a four-wheeled vehicle.

Figure 9:
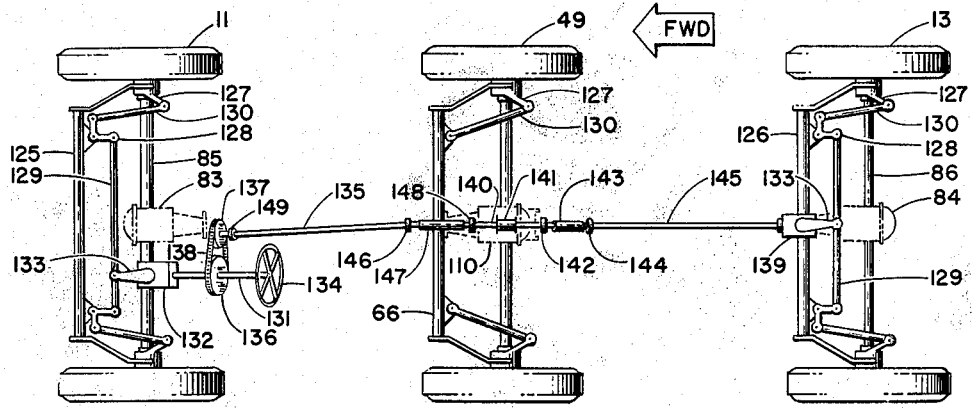
FIGURE 9 is a diagrammatic view of the steering means.
Figure 10:
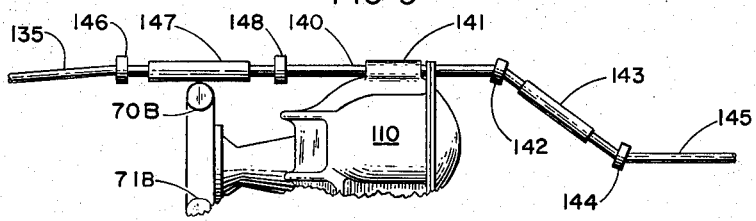
FIGURE 10 is a side view of the steering system components in the region of the middle differential.

A preferred means providing coordinated steering of the front and rear wheels 11, 13 is shown diagrammatically in FIGURES 9 and 10. The forward and rear torque rod housings 125, 126 and differentials 83, 84 are rigidly attached to the front and rear bodies (not shown) and are connected by the previously described axles 85, 86 to the associated wheels 11, 13. The mounting of the middle differential 110 and wheels 49 on the vehicle has been described.

Each front and rear wheel 11, 13 is provided with an arm 127 connecting its spindle, through a link 130, with a bell crank 128 pivotally mounted on, for example, the adjacent torque rod housing 125 or 126. The bell cranks 128 at the front wheels 11 are connected in the usual manner by a tie rod 129, and another rod 129 is similarly employed at the rear wheels 13. Motion of the front tie rod 129 and accompanying deflection of the front wheels 11 results from motion initiated at the steering wheel 134 and transmitted thereto through the shaft 131, steering box 132, and arm 133.

For transmitting steering impulses to the rear wheels 13, a shaft 135 is mechanically linked, as by sprockets 136, 137 and chain 138, to the steering column shaft 131 and hence turns whenever the steering wheel 134 is turned. The shaft 135 extends to a rear steering box 139. The rear steering box 139 is inverted relative to the front box 132, hence its output (and consequently the deflection of the rear tie rod 129 and wheels 13) is opposite to that of the front box 132 (and deflection of the front tie rod 129 and wheels 11). Consequently, where the front and rear wheels 11, 13 are equally spaced from the middle wheels 49, they are deflected equally and oppositely, as shown in FIGURE 1A, upon the steering wheel 134 being turned, and the rear wheels 13 follow the track of the front wheels 11.

Where the above steering arrangement is employed in a vehicle with forward and rear bodies 14, 15 (FIGURE 2) rotatable and pivotable relative to each other as shown in FIGURES 3 and 4, the shaft 135 is articulated and provided with slip joints to allow operation of the steering means in all positions of the rear body relative to the forward body. An intermediate segment 140 of the shaft is mounted on and held in alignment with the middle differential 110 by a bearing 141. The segment 140 thus moves with the middle wheels 49 and differential 110 (FIGURES 2, 6) as they rotate about the longitudinal axis 27 of the connecting means. This produces lateral and vertical motion of the segment 140 relative to the rear steering box 139 which changes the distance between the segment 140 and box 139, the motion and change in length being allowed for by a universal joint 142 on the rear end of the intermediate segment 140 followed by a splined slip-joint 143 and another universal joint 144 connecting the slip-joint 143 to a rear shaft segment 145 which terminates in the steering box 139. The above items also permit the previously described pivoting and rotation of the rear body on the forward body without disrupting operation of the steering means.

Rotation of the intermediate wheels 49 and differential 110 about the connecting means longitudinal axis 27 (FIGURE 6) also moves the intermediate segment 140 laterally and vertically relative to the sprocket 137 on the forward shaft 135 and changes the distance between them. The motion and necessary change in shaft length are provided for by connecting the rear end of the shaft 135 to the intermediate shaft 140 through, in the order named, a universal joint 146, slip joint 147, and universal joint 148 and by providing still another universal joint 149 at the forward end of the forward shaft segment 135.

Since the housing of the rear steering box 139 rotates with the rear body 15 when the latter rotates on the forward body 14, while the rear shaft segment 145 does not, rotation of the rear body 15 on the forward body 14 rotates the housing of the box 139 relative to the rear shaft segment 145. The result is the delivery of a spurious rotary input to the rear steering box 139 which does not arise from or correspond to a motion of the steering wheel 134. Though in theory it produces some misalignment of the rear wheels 13 and hence some scuffing, this is not ordinarily serious because rotation of the rear body on the forward body does not perceptibly occur on highways and the effect of the sideward scuffing is not serious in the loose, uneven terrain where it is most apt to occur.

Means are provided, however, which readily minimize the misalignment and make it and accompanying scuffing of no consequence. By making the sprocket 136 connected to the steering wheel larger than the sprocket 137 on the forward shaft segment, the latter and the rear shaft segment 145 may be made to rotate several times during one rotation of the steering wheel 134 to provide a steering impulse to the steering boxes 132, 139. Though a rotation of the rear body on the forward body still introduces an error into the rotary steering impulse transmitted by the shaft rear segment into the rear gear box 139, the magnitude of the error is much smaller, percentagewise, than formerly. The gear ratio of the rear steering box 139 is such as to reduce the output of the shaft rear segment 145 into conformity with that of the steering column shaft 131.

Figure 11:
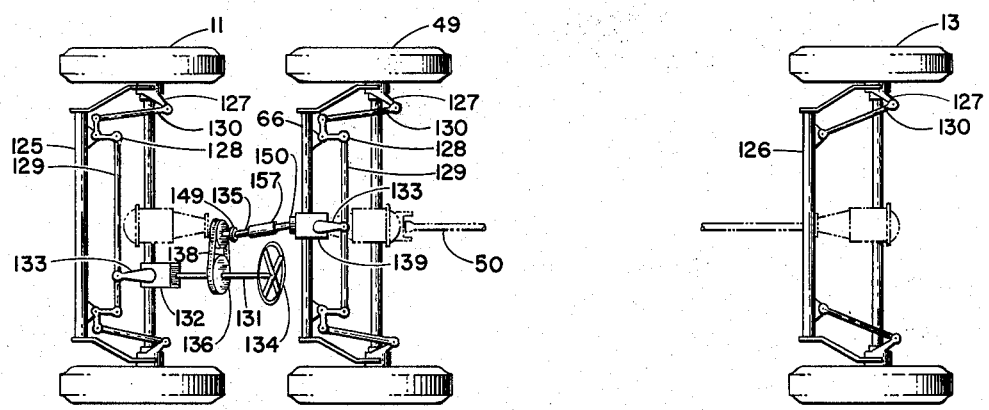
FIGURE 11 is a diagrammatic view of the steering means as modified for a vehicle with steerable front and intermediate wheels.

FIGURE 11 shows a modification of the steering system adapted for a vehicle whose intermediate wheels 49 and also another set of wheels, for instance the front wheels 11, are steerable. The steering wheel 134, steering shaft 131, steering boxes 132 and 139, arms 133, tie rods 129, bell cranks 128, links 130 (levers 127, sprockets 136, 137, chain 138, universal 149, and shaft 135 are as in FIGURE 9 with certain exceptions. The rear movable arms 127 are connected to the spindles of the intermediate (not rear) wheels 49 and the rear steering box 139 and bell cranks 128 are mounted on the torque rod housing 66 of the intermediate wheels, the spindles of the latter being connected to the rear bell cranks 128 by the rear links 130. Besides the universal joint 149 on its forward end, the shaft forward segment 135 has a rear universal joint 150 and, between the two universal joints, a splined slip joint 151. The slip joint and universals allow for steering of the intermediate wheels 49 during all their positions of rotation relative to the vehicle body. The rear wheels, driven by the shaft 50, are held in rigid alignment by rigidly connecting their arms 127 to the torque rod housing 126 through rear links 130. Since the turning radius of this modification of the vehicle is, as shown in FIGURE 1B, through the rear wheels 13, the intermediate wheels 49 turn on a shorter radius than the forward wheels 11 and hence must be deflected more sharply in executing any given turn of the vehicle. This is effected by establishing the geometry of the bell cranks and/or levers 127 at the intermediate wheels 49 or front wheels 11 in a manner which is well known to those versed in the art.

It will be understood that torsion bar suspension means for the wheels of the vehicle have been shown and described only to provide a preferred example of an embodiment of the invention and that the scope of the invention includes the use of other wheel-springing devices on the vehicle, of which other devices pneumatic, leaf, and coil springs are noted as examples. It will be further understood that whereas all three sets of wheels are selectively powerable in the preferred embodiment, modifications of the invention are desirable, for some usages, wherein the range of power selection is less comprehensive. An arrangement, for example, which is advantageous is one in which the selection available permits powering none of the wheels in one case, all the wheels in another, and only the intermediate wheels in still another case.

While only one embodiment of the invention, together with several modifications thereof, has been described in detail herein and shown in the accompanying drawing, it will be evident that various and further modifications are possible in the arrangement and construction of the components thereof without departing from the scope of the invention.

I claim:
1. A six-wheeled vehicle having:
   a forward body with a longitudinal axis;
   a rear body with a longitudinal axis;
   one pair of wheel mounted on one, and two pairs of wheels mounted on the other of said bodies, all of said wheels being in load-bearing relation between the vehicle bodies and the ground and two of said pairs of wheels being deflectable relative to said bodies for steering said vehicle; and
   attachment means rotatably and pivotally joining said rear body to said forward body for rotation of said rear body on a longitudinal axis and pivoting on a transverse axis,
   said attachment means including means limiting pivoting of said rear body on said forward body at all times, including and following intervals during which said two of said pairs of wheels are being deflected, to motion in a plane which is vertical when said rear body is laterally level, said last-named means including structure laterally spaced on each side of said forward body longitudinal axis, intersecting said transverse axis, and connected with said forward and rear bodies,
   said attachment means further including means restricting rotation of said rear body relative to said forward body, in all pivoted positions of the rear body, to rotation about an axis fixed in a common vertical plane with the longitudinal axis of the forward body.
2. A six-wheeled vehicle having:
   a forward body with a longitudinal axis;
   a rear body with a longitudinal axis;
   one pair of wheels mounted in supporting relation to one, and two pairs of wheels mounted in supporting relation to the other of said bodies, two of said pairs of wheels being deflectable relative to said bodies for steering said vehicle; and
   means rigidly holding said longitudinal axes in a common vertical plane and permitting vertical pivoting of said rear body on said forward body about a transverse axis at all times when both said bodies are laterally level and including and following intervals during which said two pairs of wheels are being deflected;
   said means having a longitudinal axis and connecting said forward and rear bodies at spaced locations longitudinally fixed with reference to the longitudinal axes of said bodies and further having
   a first element rigidly attached to a one of the bodies and
   a second element attached on the first element rotatable about the longitudinal axis of said means and having elements laterally spaced on each side of said forward body longitudinal axis, pivotally attached to a one of said bodies other than the one to which said first element is attached, and intersecting said transverse axis.
3. A six-wheeled vehicle having:
   a first body with a longitudinal axis;
   a second body with a longitudinal axis;
   a first pair of wheels mounted in supporting relation to one, and a second pair of wheels mounted in supporting relation to the other of said bodies;
   a first member rigidly mounted on the first body and having a longitudinal axis at fixed zero angle to the longitudinal axis of the first body;
   a second member in fixed coaxial and overlapping relationship with the first member and mounted on the latter for rotation about the longitudinal axis of the first member;
   a portion of the second member having a transverse axis substantially perpendicular to the longitudinal axis of the first member and to which portion the second body is attached for pivoting about said transverse axis;
   a third pair of wheels; and
   means connecting the third pair of wheels to the first body for rotation about the longitudinal axis of and including said first member;
   whereby the second body is rotatable with the second member about the longitudinal axis of the first member and pivotable on the transverse axis of said portion of the second member.
4. A six-wheeled vehicle having:
   a forward body with a longitudinal axis;
   a rear body with a longitudinal axis;
   a first pair of wheels mounted in supporting relation to one and a second pair of wheels mounted in supporting relation to the other of said bodies;
   a first tubular member rigidly mounted on a one of the bodies and having a longitudinal axis parallel with the longitudinal axis of that body;
   a second tubular member of greater diameter than the first tubular member and rotatably mounted in coaxial, overlapping relation on the same;
   means preventing forward and rearward motion of the second tubular member on the first tubular member;
   a third pair of wheels;
   means connecting the third pair of wheels to the forward body and for rotation about the first tubular member longitudinal axis, said wheel connecting means including the first tubular member, the latter being connected in load-bearing relation between the third pair of wheels and forward body; and
   a portion of said second tubular member having an axis substantially perpendicular to the longitudinal axis of the first tubular member, the one of the bodies other than the one on which said first tubular member is mounted being pivotally attached to said portion for pivoting about the last-named axis.

5. A six-wheeled vehicle having:
a forward body with a longitudinal axis;
a rear body with a longitudinal axis;
one pair of wheels mounted in supporting relation to the rear body and two pairs of wheels mounted in supporting relation to the forward body;
a first tubular member rigidly mounted on the forward body and having a longitudinal axis parallel with with the longitudinal axis of the forward body;
a second tubular member of greater diameter than the first tubular member and rotatably mounted in overlapping relation on the same;
means preventing rearward motion of the second tubular member on the first tubular member;
a third tubular member of greater diameter than the second tubular member and rotatably and coaxially mounted on the same;
means preventing forward motion of the third tubular member relative to the first tubular member;
a connection between the second and third tubular members transmitting rearward forces on the third into the second tubular member and forward forces on the second into the third tubular member; and
a portion of the second tubular member having an axis perpendicular to the longitudinal axis of the first tubular member, the rear body being pivotally attached to said portion for pivoting about the last-named axis and one of said two pairs of wheels being mounted on the third tubular member and rotatable with the latter about the longitudinal axis of the first tubular member.

6. A six-wheeled vehicle having:
a forward body with a longitudinal axis;
a rear body with a longitudinal axis;
front and rear pairs of wheels respectively mounted in supporting relationship to the forward and rear bodies;
means rotatably and pivotally joining said rear body to said forward body, pivoting of said rear body on said forward body being limited by said means to motion in a plane which is vertical when said rear body is laterally level and rotation of said rear body relative to said forward body being restricted to rotation about an axis fixed in parallel relation with the longitudinal axis of the forward body, said means having a longitudinal axis;
a middle pair of wheels; and
means connecting the middle pair of wheels to the forward body for rotation about the longitudinal axis of, and including at least a portion of, said means joining said bodies.

7. A six-wheeled vehicle having:
a forward body and a rear body with respective longitudinal axes;
connecting means holding the forward and rear bodies in a relationship in which said axes lie in a common plane when said bodies are laterally level and permitting independent rolling of said bodies on their longitudinal axes, said body connecting means having a longitudinal axis;
a pair of wheels mounted on and supporting the forward body at locations spaced on each side of the forward body longitudinal axis, whereby said wheels dictate the position in roll of the forward body;
a pair of wheels similarly mounted on and dictating the position in roll of the rear body;
a middle pair of wheels; and
means connecting the middle pair of wheels to the forward body for rotation about the longitudinal axis of and including said connecting means, said body connecting means lying in load-bearing relation between said forward body and said middle pair of wheels.

8. A six-wheeled vehicle having:
a forward body and a rear body with respective longitudinal axes;
body connecting means holding the forward and rear bodies in a relationship in which said axes lie in a common vertical plane when said bodies are laterally level and permitting independent rolling of said bodies on their longitudinal axes, said connecting means having a longitudinal axis;
a pair of wheels mounted on and supporting the forward body at locations spaced on each side of the forward body longitudinal axis, whereby said wheels dictate the position in roll of the forward body;
a pair of wheels similarly mounted on and dictating the position in roll of the rear body;
means for coordinated steering of and connected to the forward and rear pairs of wheels;
a middle pair of wheels; and
means connecting the middle pair of wheels to the forward body for rotation about the longitudinal axis of and including at least a portion of said body connecting means.

9. A six-wheeled vehicle having:
a forward body having a longitudinal axis;
a front pair of wheels mounted on the forward body in the region of the forward end thereof and on each side of said axis and dictating the position in roll of the forward body;
a rear body having a longitudinal axis;
a rear pair of wheels mounted on each side of the longitudinal axis of and dictating the position in roll of the rear body;
a first tubular member rigidly mounted on the forward body and having a longitudinal axis below and parallel with the forward body longitudinal axis, the first tubular member having a rear end;
first stop means in the vicinity of the rear end of the first tubular member;
a second tubular member of larger diameter than and rotatably mounted on the first tubular member in rigidly coaxial relationship with the latter and held rearwardly immovable thereon by the first stop means;
a portion of the second tubular member extending rearwardly of the first tubular member and having a transverse axis normal to the longitudinal axis of the latter;
second stop means on the second tubular member;
a third tubular member of larger diameter than and rotatably mounted on and in fixed coaxial relationship with the second tubular member, the third tubular member being stopped from rearward travel on the second tubular member by the second stop means;
third stop means in axially immovable relationship with the first tubular member and holding the third tubular member in a position in which its is stopped from rearward travel on the second tubular member by the second stop means and in which position forward travel of the third tubular member is prevented by the third stop means and forward travel of the second tubular member on the first tubular member is prevented by the second stop means, third tubular member, and third stop means;
means connecting the rear body to said portion of the second tubular member for pivoting of the rear body on said transverse axis, the rear body being rotatable with the second tubular member about the longitudinal axis of the second tubular member;
suspension means mounted on the third tubular member and freely rotatable with the latter about the longitudinal axis of the first tubular member, the suspension means having ends disposed on opposite sides of the first tubular member longitudinal axis;
an intermediate pair of wheels mounted on the suspension means;

means for receiving power from a power source and transmitting the same to the intermediate pair of wheels, said means including a differential mounted on and rotatable with the third tubular member; and means for receiving power from a power source and transmitting the same to the rear wheels, the same including a drive shaft coaxial with the first tubular member and extending between the front and rear bodies, the drive shaft having a joint at which a portion of said shaft is universally pivotable about a point lying on said transverse axis.

10. The vehicle claimed in claim 9, the same further comprising means for coordinated steering of one of said pairs of wheels with at least another of said pairs of wheels.

11. A six-wheeled vehicle having:
a forward body with a longitudinal axis;
a rear body with a longitudinal axis;
a front pair of wheels;
front suspension means deflectably attaching the front pair of wheels to the forward body at points spaced on each side of the forward body longitudinal axis;
a rear pair of wheels;
rear suspension means deflectably attaching the rear pair of wheels to the rear body at points spaced on each side of the rear body longitudinal axis, the attitudes in roll of said front and rear bodies being respectively governed by the position of said front wheels and suspension means and by the position of said rear wheels and suspension means;
means for coordinated steering of and connected to said front and rear pairs of wheels;
an elongated member pivotally attached on one of said bodies at the longitudinal centerline thereof for rotation in a generally vertical plane transverse to the forward body longitudinal axis;
a middle pair of wheels mounted on the elongated member; and
attachment means rotatably and pivotally joining said rear body to said forward body for rotation about a longitudinal axis and pivoting about a transverse axis, said attachment means including means limiting pivoting of said rear body on said forward body at all times, including and following intervals during which said front and rear pairs of wheels are being deflected, to motion in a vertical plane when said rear body is laterally level, the last-named means including structure laterally spaced on each side of said forward body longitudinal axis, intersecting said transverse axis, and connected with said forward and rear bodies,
said attachment means further including means restricting rotation of said rear body relative to said forward body at all times to rotation about an axis parallel with the longitudinal axis of the forward body.

12. A vehicle having:
a first body with a longitudinal axis;
a second body with a vertical centerplane and pivotally and rotatably attached to the first body for pivoting thereon about a transverse axis and in said vertical centerplane and for rotation relative thereto about an axis parallel to said first body longitudinal axis;
means for steering said vehicle, said means comprising wheels deflectably mounted on each of said bodies
and means for deflection of and connected to said deflectably mounted wheels, said deflectably mounted wheels being disposed in load-bearing relation between the first and second bodies and the ground; and
means restraining the second body from pivoting on the first body in all planes at an angle to the vertical centerplane and at times including and following periods during which said wheels are being deflected by said means for the deflection thereof,
said restraining means including structure laterally spaced on each side of said longitudinal axis, intersecting said transverse axis, and connected with said first and second bodies.

13. A six-wheeled, steerable vehicle having:
a first body with a longitudinal axis;
a first set of wheels deflectably mounted on the first body;
a second body with a vertical centerplane;
a second set of wheels deflectably mounted on the second body;
means for coordinated deflection of and connected to the first and second sets of wheels for steering the vehicle;
means preventing at all times, including periods when the first and second sets of wheels are being deflected, the second body from pivoting on the first body in all planes at an angle to said vertical centerplane and permitting pivoting of the first body on the second body about a transverse axis, said means including structure pivotally and rotatably connected with and joining the second body and the first body, laterally spaced on each side of said first body longitudinal axis, and intersecting said transverse axis; and
a third set of wheels mounted on the vehicle between the first and second sets of wheels.

14. A six-wheeled, steerable vehicle having:
a first body portion with a longitudinal axis;
a first, dirigible set of wheels mounted on the first body portion;
a second body portion having a longitudinal axis;
a second, dirigible set of wheels mounted on the second body portion;
means for coordinated steering of and connected to said first and second sets of wheels for turning the vehicle;
attachment means connected between and pivotally and rotatably joining the first and second body portions for rotation of the second body on a longitudinal axis and pivoting on a transverse axis,
said attachment means comprising means constraining said longitudinal axes to lie in a common plane at all times, including periods when the vehicle is turning, when the first and second body portions both are laterally level, the last-named means comprising structure laterally spaced on each side of said first body portion longitudinal axis, intersecting said transverse axis, and connected with said first and second body portions; and
a third set of wheels mounted on the vehicle between the first and second sets of wheels.

15. A six-wheeled vehicle comprising:
a first body;
a second body;
structure pivotally and rotatably attaching the second body in tandem with the first body and having a longitudinal axis;
first, second, and third sets of wheels, the first and second sets being mounted respectively on the first and second bodies and two of said three sets of wheels being dirigible; and
means connecting the third set of wheels to the first body for rotation about the londitudinal axis of and including at least a portion of said structure attaching the second body in tandem with the first body, said structure lying in load-bearing relation between said first body and said third set of wheels.

16. A vehicle having:
a body with a vertical centerplane and a longitudinal axis;
a first, powered pair of wheels mounted on said body in tractive relation thereto and on opposite sides of the vertical centerplane;
an elongated member rigidly attached to the body and having a longitudinal axis lying in said vertical centerplane;
a substantially rigid, elongated structure rotatably mounted on the elongated member in perpendicular relation to and rotatable about said longitudinal axis and having two ends, the ends being located on opposite sides of said longitudinal axis;

a second pair of wheels spaced from the first pair of wheels and having respective centers spaced longitudinally of the vehicle from the ends of said elongated structure;

means resiliently mounting the second pair of wheels on the ends of said elongated structure for independent deflection of each of the second pair of wheels relative to said ends; and means for supplying tractive power to the second pair of wheels including power transmitting means rigidly mounted in relation to and rotatable with the elongated structure about said longitudinal axis and further including drive means connecting said power transmitting means and the second pair of wheels and deflectable together with the second pair of wheels relative to the elongated structure.

17. A six-wheeled vehicle having:
a first body with a longitudinal axis;
a second body with a longitudinal axis;
one pair of wheels mounted on one, and two pairs of wheels mounted on the other of the bodies in load-bearing relation between the bodies and the ground and two of said pairs of wheels being deflectable relative to said bodies for steering said vehicle; and connecting means rotatably and pivotally joining said first body to said second body for rotation on a longitudinal axis and pivoting on a transverse axis, said connecting means comprising means limiting pivoting of the second body on the first body at all times, including and following intervals during which said two of said pairs of wheels are being deflected, to motion about a transverse axis and in a plane which is vertical when the second body is laterally level and restricting rotation of the second body relative to the first body to rotation about an axis fixed in a common vertical plane with the longitudinal axis of the first body;

said connecting means further comprising an elongated member extending along the longitudinal axis of one of the bodies, means mounting the elongated member on said one of the bodies for rotation about an axis parallel with the longitudinal axis of said one of the bodies, structure comprised by said elongated member laterally spaced on each side of said first body longitudinal axis and intersecting said transverse axis, and means connecting said structure to the other of the bodies for pivoting of said other of the bodies, about said transverse axis, on the elongated member.

18. A six-wheeled vehicle having:
a first body with a longitudinal axis;
a second body with a longitudinal axis;
a first pair of wheels mounted in supporting relation to one, and a second pair of wheels mounted in supporting relation to the other of said bodies;
a first member rigidly mounted on the first body and having a longitudinal axis at fixed zero angle to the longitudinal axis of the first body;
a second member in fixed coaxial and overlapping relationship with the first member and mounted on the latter for rotation about the longitudinal axis of the first member;
a portion of the second member having a transverse axis substantially perpendicular to the longitudinal axis of the first member and to which portion the second body is attached for pivoting about said transverse axis; and
a third pair of wheels connected in supporting relation to the first body through the first member;
whereby the second body is rotatable with the second member about the longitudinal axis of the first member and pivotable on the transverse axis of said portion of the second member,
said vehicle further having a third member coaxial with and rotatably mounted on the first member, the third pair of wheels being mounted on the third member.

References Cited by the Examiner

UNITED STATES PATENTS

| | | | |
|---|---|---|---|
| 1,393,779 | 10/21 | Heinze | 180—49 |
| 1,506,653 | 8/24 | Meilike | 180—49 |
| 2,156,601 | 5/39 | Mosling | 180—14 X |
| 2,362,636 | 11/44 | Joy | 180—50 X |
| 2,374,410 | 4/45 | Brumbaugh | 180—79.2 X |
| 2,393,324 | 1/46 | Joy | 280—111 X |
| 2,595,594 | 5/52 | Martin | 180—50 |
| 2,683,496 | 7/54 | Prost | 180—50 |
| 2,883,774 | 4/59 | Clifford | 180—50 |
| 2,931,451 | 4/60 | Hancock | 37—129 |
| 2,936,037 | 5/60 | Anderson | 180—14 X |
| 2,962,176 | 11/60 | Russell | 180—14 X |

FOREIGN PATENTS 244,079   7/26   Great Britain.

A. HARRY LEVY, *Primary Examiner.*

WILLIAM J. JANOF, PHILIP ARNOLD, *Examiners.*

UNITED STATES PATENT OFFICE
CERTIFICATE OF CORRECTION

Patent No. 3,183,991 May 18, 1965

Roger L. Gamaunt

It is hereby certified that error appears in the above numbered patent requiring correction and that the said Letters Patent should read as corrected below.

Column 1, line 52, for "set" read -- sets --; line 64, for "load" read -- loads --; column 4, lines 5 and 6, strike out "The connecting means 24."; column 5, line 30, for "Boht" read -- Both --; column 7, line 6, for "ot" read -- to --; column 11, line 4, for "partailly" read -- partially --; column 12, line 73, strike out the parenthesis and insert a comma; column 13, line 49, for "wheel" read -- wheels --; column 15, line 12, strike out "with".

Signed and sealed this 12th day of October 1965.

(SEAL)
Attest:

ERNEST W. SWIDER
Attesting Officer

EDWARD J. BRENNER
Commissioner of Patents